(12) United States Patent
Zimmermann et al.

(10) Patent No.: US 8,231,237 B2
(45) Date of Patent: *Jul. 31, 2012

(54) SUB-ASSEMBLY AND METHODS FOR FORMING THE SAME

(75) Inventors: Micha Zimmermann, Haifa (IL); Noam Meir, Hezlia (IL)

(73) Assignee: Oree, Inc., Ramat Gan (IL)

( * ) Notice: Subject to any disclaimer, the term of this patent is extended or adjusted under 35 U.S.C. 154(b) by 351 days.

This patent is subject to a terminal disclaimer.

(21) Appl. No.: 12/398,635

(22) Filed: Mar. 5, 2009

(65) Prior Publication Data

US 2009/0225565 A1 Sep. 10, 2009

Related U.S. Application Data

(60) Provisional application No. 61/033,876, filed on Mar. 5, 2008, provisional application No. 61/059,932, filed on Jun. 9, 2008, provisional application No. 61/085,576, filed on Aug. 1, 2008.

(51) Int. Cl.
*G09F 13/04* (2006.01)
*G09F 13/08* (2006.01)

(52) U.S. Cl. ............ 362/97.3; 362/249.02; 362/311.02; 362/612; 362/800

(58) Field of Classification Search ........ 362/97.1–97.3, 362/249.02, 311.02, 612, 800; 349/69
See application file for complete search history.

(56) References Cited

U.S. PATENT DOCUMENTS

| | | | |
|---|---|---|---|
| 3,261,356 A | 7/1966 | Wallace | |
| 3,626,471 A | 12/1971 | Florin | |
| 3,871,747 A | 3/1975 | Andrews | |
| 3,995,934 A | 12/1976 | Nath et al. | |
| 4,551,129 A | 11/1985 | Coleman et al. | |
| 4,669,467 A | 6/1987 | Willett et al. | |
| 4,714,983 A | 12/1987 | Lang | |
| 4,762,381 A | 8/1988 | Uemiya et al. | |
| 4,783,140 A | 11/1988 | Osawa et al. | |
| 4,829,192 A | 5/1989 | Kokubu et al. | |
| 4,853,593 A | 8/1989 | Stein et al. | |
| 4,872,837 A | 10/1989 | Issalene et al. | |
| 4,878,072 A | 10/1989 | Reinten | |
| 4,903,172 A | 2/1990 | Schoniger et al. | |
| 4,906,062 A | 3/1990 | Young et al. | |
| 5,048,913 A | 9/1991 | Glenn et al. | |
| 5,061,032 A | 10/1991 | Meltz et al. | |
| 5,139,420 A | 8/1992 | Walker | |

(Continued)

FOREIGN PATENT DOCUMENTS

CN 2593229 12/2003

(Continued)

OTHER PUBLICATIONS

ISR and WO for PCT/IL2009/000248, mailed Dec. 14, 2009 (25 pages).

(Continued)

*Primary Examiner* — Jason Moon Han (74) *Attorney, Agent, or Firm* — Bingham McCutchen LLP (57) ABSTRACT

A sub-assembly matable to a waveguide having a recess therein includes a structure comprising a discrete light source disposed on a carrier, and a substrate and a heat spreader disposed beneath the structure. The structure has a contour complementary to the recess, such that, when the sub-assembly is joined to the waveguide, the discrete light source is within the waveguide.

24 Claims, 8 Drawing Sheets

U.S. PATENT DOCUMENTS

| | | | |
|---|---|---|---|
| 5,152,686 | A | 10/1992 | Duggan et al. |
| 5,165,187 | A | 11/1992 | Shahidi-Hamedani et al. |
| 5,281,134 | A | 1/1994 | Schultz |
| 5,425,730 | A | 6/1995 | Luloh |
| 5,535,105 | A | 7/1996 | Koenen et al. |
| 5,559,358 | A | 9/1996 | Burns et al. |
| 5,569,254 | A | 10/1996 | Carlson et al. |
| 5,580,154 | A | 12/1996 | Coulter et al. |
| 5,675,678 | A | 10/1997 | Neuberger et al. |
| 5,718,666 | A | 2/1998 | Alarcon |
| 5,813,752 | A | 9/1998 | Singer et al. |
| 5,813,753 | A | 9/1998 | Vriens et al. |
| 5,847,507 | A | 12/1998 | Butterworth et al. |
| 5,899,552 | A | 5/1999 | Yokoyama et al. |
| 5,947,588 | A | 9/1999 | Huang |
| 5,959,316 | A | 9/1999 | Lowery |
| 5,969,869 | A | 10/1999 | Hirai et al. |
| 6,016,038 | A | 1/2000 | Mueller et al. |
| 6,031,511 | A | 2/2000 | DeLuca et al. |
| 6,079,838 | A | 6/2000 | Parker et al. |
| 6,097,871 | A | 8/2000 | De Dobbelaere et al. |
| 6,155,699 | A | 12/2000 | Miller et al. |
| 6,226,440 | B1 | 5/2001 | Lyons |
| 6,275,512 | B1 | 8/2001 | Fermann |
| 6,278,106 | B1 | 8/2001 | Muto et al. |
| 6,322,225 | B1 | 11/2001 | Koike et al. |
| 6,329,444 | B1 | 12/2001 | McGlothlin et al. |
| 6,350,041 | B1 | 2/2002 | Tarsa et al. |
| 6,351,069 | B1 | 2/2002 | Lowery et al. |
| 6,356,691 | B2 | 3/2002 | Seong-jin et al. |
| 6,408,123 | B1 | 6/2002 | Kuroda et al. |
| 6,473,554 | B1 | 10/2002 | Pelka et al. |
| 6,488,704 | B1 | 12/2002 | Connelly et al. |
| 6,491,443 | B1 | 12/2002 | Serizawa et al. |
| 6,501,100 | B1 | 12/2002 | Srivastava et al. |
| 6,501,102 | B2 | 12/2002 | Mueller-Mach et al. |
| 6,504,301 | B1 | 1/2003 | Lowery |
| 6,522,065 | B1 | 2/2003 | Srivastava et al. |
| 6,522,794 | B1 | 2/2003 | Bischel et al. |
| 6,527,419 | B1 | 3/2003 | Galli |
| 6,528,755 | B2 | 3/2003 | Grewell et al. |
| 6,530,670 | B2 | 3/2003 | Hirayama et al. |
| 6,549,709 | B1 | 4/2003 | De Dobbelaere et al. |
| 6,551,346 | B2 | 4/2003 | Crossley |
| 6,554,462 | B2 | 4/2003 | Hulse et al. |
| 6,599,000 | B2 | 7/2003 | Nolan et al. |
| 6,608,332 | B2 | 8/2003 | Shimizu et al. |
| 6,614,179 | B1 | 9/2003 | Shimizu et al. |
| 6,621,211 | B1 | 9/2003 | Srivastava et al. |
| 6,635,363 | B1 | 10/2003 | Duclos et al. |
| 6,635,987 | B1 | 10/2003 | Wojnarowski et al. |
| 6,637,924 | B2 | 10/2003 | Pelka et al. |
| 6,671,235 | B1 | 12/2003 | Hawryluk et al. |
| 6,680,004 | B2 | 1/2004 | Ono et al. |
| 6,687,010 | B1 | 2/2004 | Horii et al. |
| 6,694,069 | B2 | 2/2004 | Kaneko et al. |
| 6,709,132 | B2 | 3/2004 | Ishibashi |
| 6,714,711 | B1 | 3/2004 | Lieberman et al. |
| 6,765,237 | B1 | 7/2004 | Doxsee et al. |
| 6,796,698 | B2 | 9/2004 | Sommers et al. |
| 6,817,735 | B2 | 11/2004 | Shimizu et al. |
| 6,847,170 | B2 | 1/2005 | Kayser |
| 6,850,665 | B2 | 2/2005 | Grubsky et al. |
| 6,853,131 | B2 | 2/2005 | Srivastava et al. |
| 6,871,982 | B2 | 3/2005 | Holman et al. |
| 6,890,234 | B2 | 5/2005 | Bortscheller et al. |
| 6,908,205 | B2 | 6/2005 | Greiner et al. |
| 6,917,057 | B2 | 7/2005 | Stokes et al. |
| 6,939,481 | B2 | 9/2005 | Srivastava et al. |
| 6,941,069 | B2 | 9/2005 | Kaneko et al. |
| 6,943,380 | B2 | 9/2005 | Ota et al. |
| 6,948,829 | B2 | 9/2005 | Verdes et al. |
| 6,965,709 | B1 | 11/2005 | Weiss |
| 6,982,522 | B2 | 1/2006 | Omoto et al. |
| 7,005,086 | B2 | 2/2006 | Matsuno et al. |
| 7,006,306 | B2 | 2/2006 | Falicoff et al. |
| 7,008,078 | B2 | 3/2006 | Shimizu et al. |
| 7,015,510 | B2 | 3/2006 | Srivastava et al. |
| 7,026,756 | B2 | 4/2006 | Shimizu et al. |
| 7,038,246 | B2 | 5/2006 | Uemura |
| 7,045,826 | B2 | 5/2006 | Kim et al. |
| 7,052,152 | B2 | 5/2006 | Harbers et al. |
| 7,071,616 | B2 | 7/2006 | Shimizu et al. |
| 7,086,767 | B2 | 8/2006 | Sidwell et al. |
| 7,123,796 | B2 | 10/2006 | Steckl et al. |
| 7,153,008 | B2 | 12/2006 | Grote, III et al. |
| 7,168,842 | B2 | 1/2007 | Chou et al. |
| 7,178,941 | B2 | 2/2007 | Roberge et al. |
| 7,204,607 | B2 | 4/2007 | Yano et al. |
| 7,215,086 | B2 | 5/2007 | Maxik |
| 7,218,824 | B2 | 5/2007 | Franklin et al. |
| 7,221,110 | B2 | 5/2007 | Sears et al. |
| 7,230,222 | B2 | 6/2007 | Cheng et al. |
| 7,251,389 | B2 | 7/2007 | Lu et al. |
| 7,259,403 | B2 | 8/2007 | Shimizu et al. |
| 7,267,787 | B2 | 9/2007 | Dong et al. |
| 7,279,832 | B2 | 10/2007 | Thurk et al. |
| 7,288,797 | B2 | 10/2007 | Deguchi et al. |
| 7,293,906 | B2 | 11/2007 | Mok et al. |
| 7,311,431 | B2 | 12/2007 | Chew et al. |
| 7,331,700 | B2 | 2/2008 | Zhang |
| 7,345,317 | B2 | 3/2008 | Reeh et al. |
| 7,347,586 | B2 | 3/2008 | Izardel |
| 7,350,936 | B2 | 4/2008 | Ducharme et al. |
| 7,367,692 | B2 | 5/2008 | Maxik |
| 7,375,381 | B2 | 5/2008 | Shimizu et al. |
| 7,391,060 | B2 | 6/2008 | Oshio |
| 7,396,142 | B2 | 7/2008 | Laizure, Jr. et al. |
| 7,399,108 | B2 | 7/2008 | Ayabe et al. |
| 7,425,798 | B2 | 9/2008 | St.-Germain |
| 7,430,355 | B2 | 9/2008 | Heikenfeld et al. |
| 7,433,565 | B2 | 10/2008 | Joseph et al. |
| 7,465,961 | B2 | 12/2008 | Masuda et al. |
| 7,479,733 | B2 | 1/2009 | Chang et al. |
| 7,481,562 | B2 | 1/2009 | Chua et al. |
| 7,513,669 | B2 | 4/2009 | Chua et al. |
| 7,537,947 | B2 | 5/2009 | Smith et al. |
| 7,607,815 | B2 | 10/2009 | Pang |
| 7,635,203 | B2 | 12/2009 | Weaver, Jr. et al. |
| 7,638,754 | B2 | 12/2009 | Morimoto et al. |
| 7,639,916 | B2 | 12/2009 | Fine |
| 7,661,841 | B2 | 2/2010 | Kurihara et al. |
| 7,690,803 | B2 | 4/2010 | Miyashita et al. |
| 7,717,589 | B2 | 5/2010 | Nishioka et al. |
| 7,719,022 | B2 | 5/2010 | Maeda |
| 7,722,211 | B2 | 5/2010 | Marra et al. |
| 7,736,042 | B2 | 6/2010 | Park, II et al. |
| 7,736,044 | B2 | 6/2010 | Chew et al. |
| 7,738,054 | B2 | 6/2010 | Okumura et al. |
| 7,791,683 | B2 | 9/2010 | Larson et al. |
| 7,826,698 | B1 | 11/2010 | Meir et al. |
| 7,903,198 | B2 | 3/2011 | Abe et al. |
| 8,033,706 | B1 | 10/2011 | Kelly et al. |
| 8,064,743 | B2 | 11/2011 | Meir et al. |
| 2001/0046142 | A1 | 11/2001 | Van Santen et al. |
| 2001/0053072 | A1 | 12/2001 | Takemoto |
| 2002/0118907 | A1 | 8/2002 | Sugama et al. |
| 2002/0122629 | A1 | 9/2002 | Grubsky et al. |
| 2004/0012556 | A1 | 1/2004 | Yong et al. |
| 2004/0156182 | A1 | 8/2004 | Hatjasalo et al. |
| 2004/0196648 | A1 | 10/2004 | Franklin et al. |
| 2004/0246697 | A1 | 12/2004 | Yamashita et al. |
| 2004/0257352 | A1 | 12/2004 | Naugler et al. |
| 2005/0100288 | A1 | 5/2005 | Chu |
| 2005/0116667 | A1 | 6/2005 | Mueller et al. |
| 2005/0243243 | A1 | 11/2005 | Koganezawa |
| 2005/0258432 | A1 | 11/2005 | Cho |
| 2005/0265403 | A1 | 12/2005 | Anderson et al. |
| 2006/0001036 | A1 | 1/2006 | Jacob et al. |
| 2006/0001037 | A1 | 1/2006 | Schardt et al. |
| 2006/0002146 | A1 | 1/2006 | Baba |
| 2006/0008205 | A1 | 1/2006 | Meir et al. |
| 2006/0012286 | A1 | 1/2006 | Cull et al. |
| 2006/0092346 | A1 | 5/2006 | Moon et al. |
| 2006/0098434 | A1 | 5/2006 | Liu et al. |
| 2006/0131924 | A1 | 6/2006 | Reck |
| 2006/0164840 | A1 | 7/2006 | Song et al. |

| | | |
|---|---|---|
| 2006/0170332 A1 | 8/2006 | Tamaki et al. |
| 2006/0193133 A1 | 8/2006 | Von Der Brelie |
| 2006/0203502 A1 | 9/2006 | Stevens et al. |
| 2006/0208670 A1 | 9/2006 | Chang et al. |
| 2006/0221610 A1 | 10/2006 | Chew et al. |
| 2006/0227085 A1 | 10/2006 | Boldt et al. |
| 2006/0245213 A1 | 11/2006 | Beil et al. |
| 2006/0262250 A1 | 11/2006 | Hobbs |
| 2006/0268537 A1 | 11/2006 | Kurihara et al. |
| 2006/0273337 A1 | 12/2006 | Han et al. |
| 2006/0290253 A1 | 12/2006 | Yeo et al. |
| 2007/0057626 A1 | 3/2007 | Kurihara et al. |
| 2007/0086211 A1 | 4/2007 | Beeson et al. |
| 2007/0103914 A1 | 5/2007 | McCaffrey |
| 2007/0133210 A1 | 6/2007 | Watson et al. |
| 2007/0133935 A1 | 6/2007 | Fine |
| 2007/0138966 A1 | 6/2007 | Marka et al. |
| 2007/0187710 A1 | 8/2007 | Steen et al. |
| 2007/0188425 A1 | 8/2007 | Saccomanno |
| 2007/0274094 A1 | 11/2007 | Schultz et al. |
| 2007/0284600 A1 | 12/2007 | Shchekin et al. |
| 2008/0007541 A1 | 1/2008 | Eliasson et al. |
| 2008/0029720 A1 | 2/2008 | Li |
| 2008/0049445 A1 | 2/2008 | Harbers et al. |
| 2008/0055931 A1 | 3/2008 | Verstraete et al. |
| 2008/0061683 A1 | 3/2008 | Bertram |
| 2008/0094348 A1 | 4/2008 | Yin et al. |
| 2008/0122365 A1 | 5/2008 | Decius et al. |
| 2008/0151576 A1 | 6/2008 | Inditsky |
| 2008/0186736 A1 | 8/2008 | Rinko |
| 2008/0192458 A1 | 8/2008 | Li |
| 2008/0205080 A1 | 8/2008 | Erchak et al. |
| 2008/0212315 A1 | 9/2008 | Cornelissen et al. |
| 2008/0218993 A1 | 9/2008 | Li |
| 2008/0239749 A1 | 10/2008 | Saccomanno et al. |
| 2008/0251690 A1 | 10/2008 | Keiper et al. |
| 2008/0252571 A1 | 10/2008 | Hente et al. |
| 2008/0297644 A1 | 12/2008 | Farchtchian et al. |
| 2008/0305439 A1 | 12/2008 | Khan |
| 2008/0316605 A1 | 12/2008 | Hazell et al. |
| 2009/0001397 A1 | 1/2009 | Fine et al. |
| 2009/0002668 A1 | 1/2009 | Rohe et al. |
| 2009/0016060 A1 | 1/2009 | Nakao |
| 2009/0027588 A1 | 1/2009 | Medendorp, Jr. et al. |
| 2009/0046453 A1 | 2/2009 | Kramer |
| 2009/0046978 A1 | 2/2009 | Yasuda et al. |
| 2009/0052205 A1 | 2/2009 | Chen et al. |
| 2009/0059553 A1 | 3/2009 | Lin |
| 2009/0067194 A1 | 3/2009 | Sanchez |
| 2009/0116801 A1 | 5/2009 | Fine |
| 2009/0129115 A1 | 5/2009 | Fine et al. |
| 2009/0141476 A1 | 6/2009 | Meir et al. |
| 2009/0151575 A1 | 6/2009 | Eisendrath |
| 2009/0161341 A1 | 6/2009 | Meir et al. |
| 2009/0161361 A1 | 6/2009 | Meir et al. |
| 2009/0161369 A1 | 6/2009 | Regev et al. |
| 2009/0161383 A1 | 6/2009 | Meir et al. |
| 2009/0162015 A1 | 6/2009 | Meir et al. |
| 2009/0168395 A1 | 7/2009 | Mrakovich et al. |
| 2009/0201955 A1 | 8/2009 | Weigl et al. |
| 2009/0212718 A1 | 8/2009 | Kawashima et al. |
| 2009/0225566 A1 | 9/2009 | Zimmermann et al. |
| 2009/0273918 A1 | 11/2009 | Falicoff et al. |
| 2009/0284177 A1 | 11/2009 | Pedersen |
| 2009/0290380 A1 | 11/2009 | Meir et al. |
| 2009/0296018 A1 | 12/2009 | Harle et al. |
| 2009/0303412 A1 | 12/2009 | Ake et al. |
| 2009/0310338 A1 | 12/2009 | Negley |
| 2009/0322251 A1 | 12/2009 | Hilgers |
| 2010/0002414 A1 | 1/2010 | Meir et al. |
| 2010/0008628 A1 | 1/2010 | Shani |
| 2010/0033420 A1 | 2/2010 | Jheng |
| 2010/0045189 A1 | 2/2010 | Storch et al. |
| 2010/0046219 A1 | 2/2010 | Pijlman et al. |
| 2010/0060157 A1 | 3/2010 | Shi |
| 2010/0079841 A1 | 4/2010 | Levola |
| 2010/0098377 A1 | 4/2010 | Meir |
| 2010/0195306 A1 | 8/2010 | Helbing et al. |
| 2010/0201611 A1 | 8/2010 | Duong et al. |
| 2010/0208469 A1 | 8/2010 | Shani |

FOREIGN PATENT DOCUMENTS

| | | |
|---|---|---|
| CN | 1321344 | 6/2007 |
| DE | 1 995 2430 | 5/2001 |
| EP | 0911658 | 4/1999 |
| EP | 1 376 708 A | 1/2004 |
| EP | 1521503 A1 | 4/2005 |
| EP | 1776722 A2 | 4/2007 |
| EP | 1876385 A2 | 1/2008 |
| EP | 1901587 A2 | 3/2008 |
| EP | 1988752 A1 | 11/2008 |
| EP | 2018089 A2 | 1/2009 |
| GB | 512062 A | 8/1939 |
| GB | 2339318 A | 1/2000 |
| GB | 2 343 361 | 5/2000 |
| GB | 2 448 564 | 10/2008 |
| JP | 5-127158 | 5/1993 |
| JP | 10-247412 A | 9/1998 |
| JP | 2004-241282 | 8/2004 |
| JP | 2005-085718 | 3/2005 |
| KR | 09/0224279 | 3/2009 |
| WO | WO-96-23649 | 8/1996 |
| WO | WO-97-31219 | 8/1997 |
| WO | WO-9912400 A1 | 3/1999 |
| WO | WO-0182657 A1 | 11/2001 |
| WO | WO-02095289 A1 | 11/2002 |
| WO | WO-03-050448 | 6/2003 |
| WO | WO-03/065201 A1 | 8/2003 |
| WO | WO-2004-017109 | 2/2004 |
| WO | WO-2004034362 A2 | 4/2004 |
| WO | WO-2004-0053531 | 6/2004 |
| WO | WO-2004100275 A1 | 11/2004 |
| WO | WO-2005096258 A1 | 10/2005 |
| WO | WO-2005101070 A1 | 10/2005 |
| WO | WO-2006-131924 A | 12/2006 |
| WO | WO 2006129625 A1 * | 12/2006 |
| WO | WO-2007044472 A2 | 4/2007 |
| WO | WO-2007/055509 | 5/2007 |
| WO | WO-2007071397 A1 | 6/2007 |
| WO | WO-2007/086657 | 8/2007 |
| WO | WO-2008013097 A1 | 1/2008 |
| WO | WO-2008035282 A1 | 3/2008 |
| WO | WO-2008/045311 | 4/2008 |
| WO | WO-2008053063 A1 | 5/2008 |
| WO | WO-2008059445 A2 | 5/2008 |
| WO | WO-2008/100277 | 8/2008 |
| WO | WO-2008093267 A1 | 8/2008 |
| WO | WO-2008-146290 A3 | 12/2008 |
| WO | WO-2008148927 A1 | 12/2008 |
| WO | WO-2009130637 A1 | 10/2009 |

OTHER PUBLICATIONS

Office Action in Israel Patent Application No. 169122, dated Dec. 22, 2008 (translation).
"Solid-State Lighting Research and Development: Multi-year Program Plan," U.S. Department of Energy, 162 pages (Mar. 2010).
Tsao et al., "Solid-state lighting: an integrated human factors, technology and economic perspective," Proc. IEEE, pp. 1-18 (Aug. 2009).
International Search Report and Written Opinion for PCT/IB2010/052844, mailed Mar. 31, 2011 (11 pages).
International Search Report and Written Opinion for PCT/IL2008/01554, dated May 19, 2009.
International Search Report and Written Opinion mailed Oct. 11, 2011 for International Application No. PCT/IB2010/056079 (11 pages).
Allen et al., "A nearly ideal phosphor-converted white light-emitting diode" *Appl. Phys. Ltrs.* 92: 143309 (2008).
Beeson et al., "61.5: LED-Based Light-Recycling Light Sources for Projection Displays," *SID Symp. Dig. of Tech. Papers*, 37(1): 1823-1826 (2006).
Fine, "Back Light Modular Unit (BLMu) for large LCD screens", SIL 2006.

International Search Report and Written Opinion for PCT/IL 08/01553, mailed Mar. 25, 2009.
International Search Report and Written Opinion for PCT/IL2006/000667, dated Jun. 10, 2008.
International Search Report for PCT/IL2003/01042, mailed Jul. 29, 2004.
International Search Report for PCT/IL2008/000730, mailed Nov. 25, 2008.

Smith-Gillespie, R., "LCD Backlighting Options and Design Considerations", SID Display Applications Tutorial, May 22, 2008.
Zwanenburg et al., "41.2: High efficiency LEDs for LCD Backlights," *SID 04 Digest*, p. 1222, ISSN/0004-0966X/04/3502-1222, 2004.

* cited by examiner

SUB-ASSEMBLY AND METHODS FOR FORMING THE SAME

CROSS-REFERENCE TO RELATED APPLICATIONS

This application claims priority to and the benefit of U.S. Provisional Patent Application No. 61/033,876, filed Mar. 5, 2008; U.S. Provisional Patent Application No. 61/059,932, filed Jun. 9, 2008; and U.S. Provisional Patent Application No. 61/085,576, filed on Aug. 1, 2008. The entire disclosure of each of these applications is incorporated by reference herein.

TECHNICAL FIELD

In various embodiments, the present invention relates to sub-assemblies for artificial lighting, and in particular to sub-assemblies supporting discrete light sources such as light-emitting diodes.

BACKGROUND

Utilizing a discrete light source, such as a light-emitting diode (LED) to create a large, efficient, uniformly emitting illumination device is difficult. Light from the light source may be obstructed or absorbed by any number of structures between the light source and the region of desired illumination; such structures may include LED packaging, wiring circuitry, and even parts of the sub-assembly supporting the light source. In devices utilizing multiple light sources, e.g., devices for the illumination of white light produced by color mixing, emitted light may even be obstructed or absorbed by neighboring light sources. Further, attempts to harness most of the light from the light source may require complicated fabrication processes that are expensive and not mass-producible.

Typical illumination devices incorporating discrete light sources also disregard the fact that light emitted downward from the light source (or light back-reflected toward the light source) is often lost, reducing the efficiency of the device. This drop in efficiency may be severe, particularly for devices incorporating multiple light sources. Clearly, a need exists for illumination devices (and components thereof) designed for the efficient in-coupling of light emitted from discrete light sources, as well as for the minimization of light obstructed or absorbed by other components or even other light sources.

SUMMARY

Embodiments of the present invention include sub-assemblies for the support and connectivity of discrete light sources, as well as illumination devices incorporating such sub-assemblies, and a waveguide for the controlled propagation and emission of light. In general, sub-assemblies in accordance with embodiments of the invention position discrete light sources above substantially all other components of the sub-assembly in order to minimize the amount of light obstructed or absorbed by such structures. In some embodiments, the sub-assemblies mate with the waveguide; for example, the sub-assembly (or portion thereof) may have a geometric contour or envelope complementary to a recess in the waveguide, thus facilitating manufacturability and enabling the "embedding" of the light source into the waveguide (rather than positioning the light source at the waveguide edge, for example). In addition to providing a superior optical interface for discrete light sources, sub-assemblies in accordance with the present invention may provide mechanical support, electrical connectivity, and thermal management.

In an aspect, embodiments of the invention feature a sub-assembly matable to a waveguide having a recess therein. The sub-assembly includes a structure that itself includes a discrete light source disposed on a carrier. The structure has a contour complementary to the recess such that, when the sub-assembly is joined to the waveguide, the discrete light source is within the waveguide. A substrate and a heat spreader are disposed beneath the structure.

One or more of the following features may be included. The structure may fit snugly within the recess. The discrete light source may include a bare-die light-emitting diode. A dimension of the top surface of the carrier may be at least three times a dimension of the discrete light source. The top surface of the carrier may have an area at least three times an area of the discrete light source. The top surface of the carrier may be reflective, and may include an inner diffusive region surrounding the discrete light source and a specular region surrounding the inner diffusive region. The top surface of the carrier may include an inner specular region surrounding the discrete light source, a diffusive region surrounding the inner specular region, and an outer specular region surrounding the diffusive region.

A reflector may be disposed over the substrate. The discrete light source may be disposed in a recess in the carrier, and a top surface of the discrete light source may be substantially coplanar with the top surface of the carrier. The top surface of the carrier may include a step complementary to the bottom surface of the discrete light source. The structure may include a cap disposed over the discrete light source, and a shape of the cap may at least partially define the contour of the structure complementary to the recess in the waveguide. The shape of the carrier may define the contour of the structure complementary to the recess in the waveguide.

The discrete light source may be electrically connected to the carrier. A contact on the discrete light source may be in direct contact with a contact on the carrier. The discrete light source may be electrically connected to the carrier and/or the substrate by at least one wire. A contact on the carrier may be in direct contact with a contact on the substrate. The substrate and/or the carrier may include an electrical connector for connection to an external power source.

In another aspect, embodiments of the invention feature a sub-assembly including a discrete light source, where substantially all of the light emitted from the discrete light source is emitted from its top surface. A reflective carrier is disposed beneath and in direct contact with the discrete light source. A top surface of the reflective carrier includes an inner diffusive region surrounding the discrete light source and a specular region surrounding the inner diffusive region.

In yet another aspect, embodiments of the invention feature a sub-assembly including a discrete light source, where substantially all of the light emitted from the discrete light source is emitted from its top surface and at least one side surface. A reflective carrier is disposed beneath and in direct contact with the discrete light source. A top surface of the reflective carrier includes an inner specular region surrounding the discrete light source, a diffusive region surrounding the inner specular region, and an outer specular region surrounding the diffusive region.

In another aspect, embodiments of the invention feature a method of forming a sub-assembly matable to a waveguide having a recess. The method includes providing a structure that includes a discrete light source disposed on a carrier, the structure having a contour complementary to the recess such that, when the structure is mated to the waveguide, the discrete light source is within the waveguide. The method also includes disposing the structure over a substrate and a heat spreader. Providing the structure may include providing a cap over the discrete light source, the shape of the cap at least partically defining the contour of the structure complementary to the recess in the waveguide. The shape of the carrier may at least partially define the contour of the structure complementary to the recess in the waveguide.

In an aspect, embodiments of the invention feature an illumination device including a waveguide having a recess in a bottom surface thereof. Disposed beneath and in direct contact with the bottom surface of the waveguide is a sub-assembly having a raised profile complementary to the recess. The sub-assembly includes a discrete light source disposed on a carrier, and the discrete light source is disposed in the recess.

One or more of the following features may be included. The sub-assembly may include a cap disposed over the discrete light source. The sub-assembly may include a substrate and a reflector disposed over the substrate, and the reflector may be disposed beneath and in direct contact with the bottom surface of the waveguide proximate the recess. The top surface of the waveguide may be substantially planar. The discrete light source may include a bare-die light-emitting diode. At least one sidewall and/or the top surface of the carrier may be reflective. The top surface of the carrier may include an inner diffusive region surrounding the discrete light source and a specular region surrounding the inner diffusive region. The top surface of the carrier may include an inner specular region, a diffusive region surrounding the inner specular region, and an outer specular region surrounding the diffusive region.

In another aspect, embodiments of the invention feature an illumination device including a waveguide having a substantially planar bottom surface. Disposed beneath and in direct contact with the bottom surface is a sub-assembly having a substantially planar top surface and a discrete light source disposed on a reflective carrier. A dimension of the reflective carrier may be at least three times a dimension of the discrete light source. The top surface of the carrier may include an inner diffusive region surrounding the discrete light source and a specular region surrounding the inner diffusive region. The top surface of the carrier may include an inner specular region, a diffusive region surrounding the inner specular region, and an outer specular region surrounding the diffusive region.

In yet another aspect, embodiments of the invention feature a method of forming an illumination device including providing a waveguide comprising a recess in a bottom surface thereof. A sub-assembly having a raised profile complementary to the recess is provided, the sub-assembly including a discrete light source disposed on a carrier. The waveguide and the sub-assembly are mated such that the discrete light source is disposed within the recess. A top surface of the waveguide may be substantially planar. The discrete light source may include a bare-die light-emitting diode.

In a further aspect, embodiments of the invention feature a plurality of sub-assemblies, each of which includes a plurality of discrete lighting devices disposed over a carrier, carrier interconnections disposed on the carrier and electrically connected to the discrete lighting devices, and a substrate disposed beneath the carrier and including substrate interconnections. The substrate interconnections are disposed on the substrate and are electrically connected to the carrier interconnections. The plurality of discrete lighting devices on a first sub-assembly is connected in series, the plurality of discrete lighting devices on a second sub-assembly is connected in parallel, and the carrier interconnections of the first sub-assembly is substantially identical to the carrier interconnections of the second sub-assembly. Each sub-assembly may be joined to a waveguide, and each sub-assembly may include a contour complementary to a recess in the waveguide to which it is joined. The series connection on the first sub-assembly may be defined by the substrate interconnections on the first sub-assembly. The parallel connection on the second sub-assembly may be defined by the substrate interconnections on the second sub-assembly.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1A:
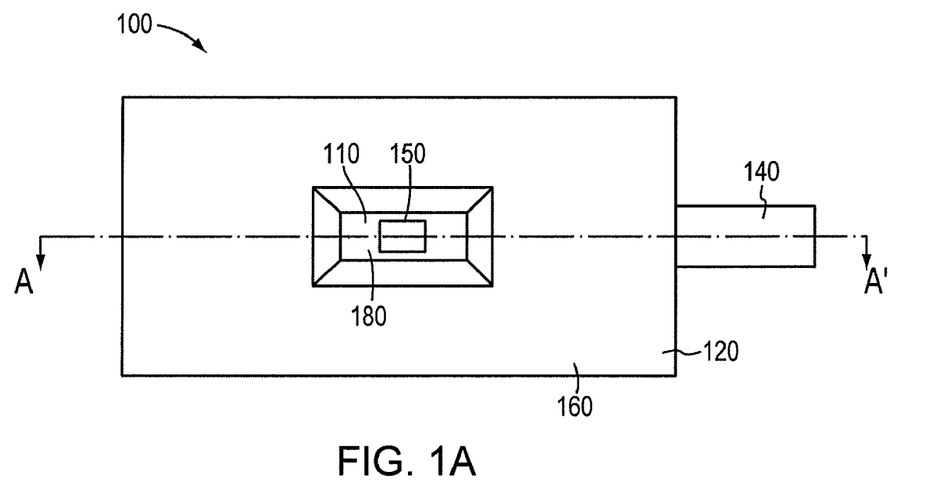
FIG. 1A is a top view of a sub-assembly, according to various exemplary embodiments of the present invention.
Figure 1B:
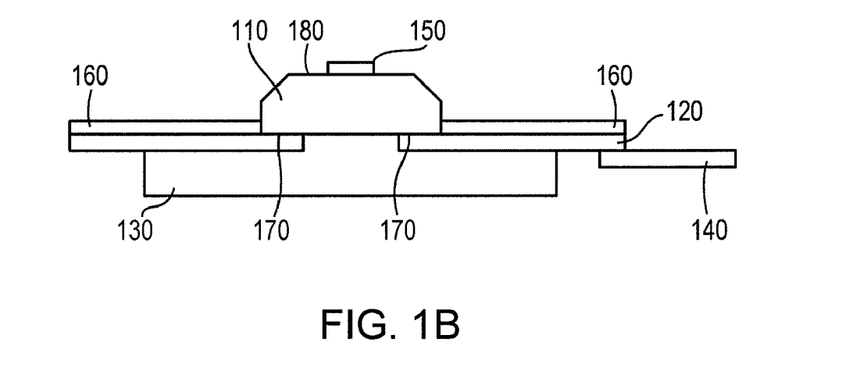
FIG. 1B is a sectional view, taken along the line A-A', of the sub-assembly shown in FIG. 1A.

Referring to FIGS. 1A and 1B, a sub-assembly 100 includes or consists essentially of a carrier 110, a substrate 120, heat spreader 130, and electrical connection means 140. Carrier 110 is typically formed of an electrically insulating, e.g., ceramic, material, and supports one or more discrete light sources (e.g., LEDs) 150. In an embodiment, carrier 110 is thermally conductive (and may therefore even be electrically conductive) in order to provide better heat dissipation. Substrate 120 may be formed of any rigid or flexible material, e.g., Bakelite or polycarbonate. In an embodiment, substrate 120 includes or consists essentially of a printed circuit board (PCB). Substrate 120 may have a thickness ranging from approximately 25 μm to approximately 50 μm. Additional active and/or passive electrical components may be present on substrate 120, and may be electrically connected to discrete light source 150 by means of wires, printed conductive traces or the like. Heat spreader 130 is disposed beneath carrier 110 and includes or consists essentially of a thermally conductive material, e.g., a metal such as aluminum or copper. Heat spreader 130 conducts heat away from carrier 110 and discrete light source 150 during operation thereof. Exposed top portions of substrate 120 surrounding carrier 120 are preferably coated with a reflective material to form a reflector 160, e.g., a specular mirror. Reflector 160 functions to contain light within a waveguide coupled to sub-assembly 100 (as further described below), and may be attached to substrate 120 via an adhesive such as VHB cold-pressing tape available from 3M. The adhesive preferably is compatible with and may mediate thermal expansion-related stresses between waveguide 210, reflector 160, and substrate 120. Discrete light source 150 is, e.g., a bare-die light-emitting diode (LED), i.e., a substantially unpackaged LED. Preferably (and as described further below), carrier 110 has a geometric profile complementary to that of a recess in a waveguide, such that when sub-assembly 100 is mated to the waveguide, discrete light source 150 is disposed within the waveguide. The top surface 180 of carrier 110 is preferably reflective, e.g., diffusive and/or specular, as further described below.

Electrical conduction means 140 is a conventional electrical interface to an external power source (not shown), and is electrically connected to discrete light source 150 through substrate 120 and carrier 110. In an embodiment, discrete light source 150 is a flip-chip LED having two electrodes coupled to electrical contacts disposed between carrier 110 and discrete light source 150; for example, the electrical contacts may pads on the surface of carrier 110 and connected to wires extending through the thickness of the carrier. In this way, the electrical contacts are electrically coupled to contact pads 170 on substrate 120 beneath carrier 110. Contact pads 170, in turn, are coupled (on and/or through substrate 120) to electrical conduction means 140. In an embodiment, electrical conduction means 140 includes or consists essentially of a flexible "PCB tail" connector attached to substrate 120. In another embodiment, electrical conduction means 140 is directly connected to carrier 110 rather than substrate 120.

Figure 2A:
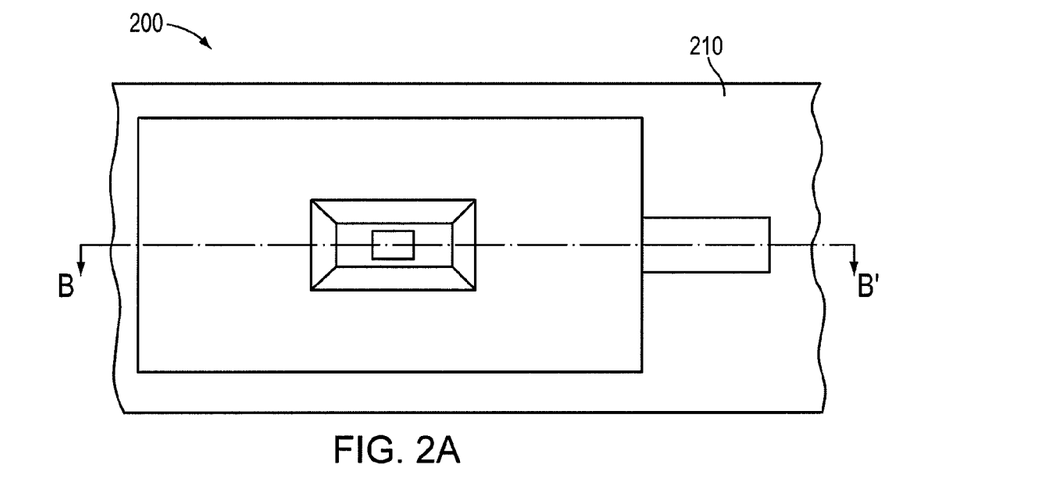
FIGS. 2A-2C are, respectively, a top view (FIG. 2A), an exploded sectional view (FIG. 2B), and a sectional view (FIG. 2C) of an illumination device incorporating the sub-assembly of FIGS. 1A-1B.
Figure 2B:
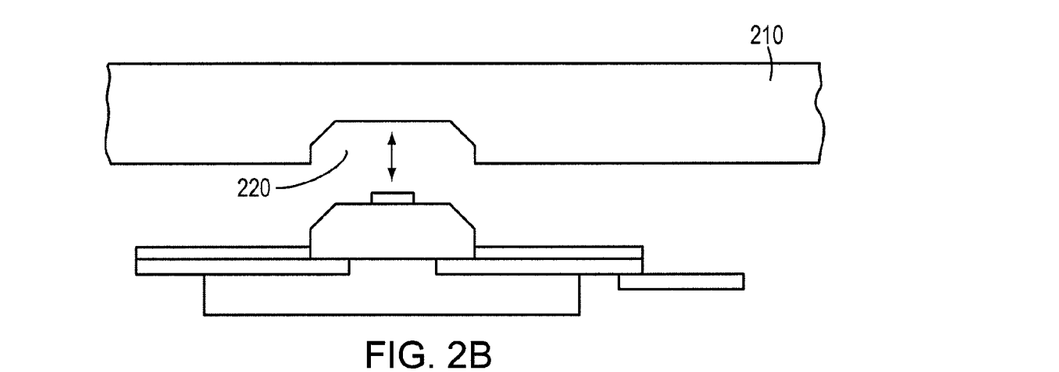
Figure 2C:
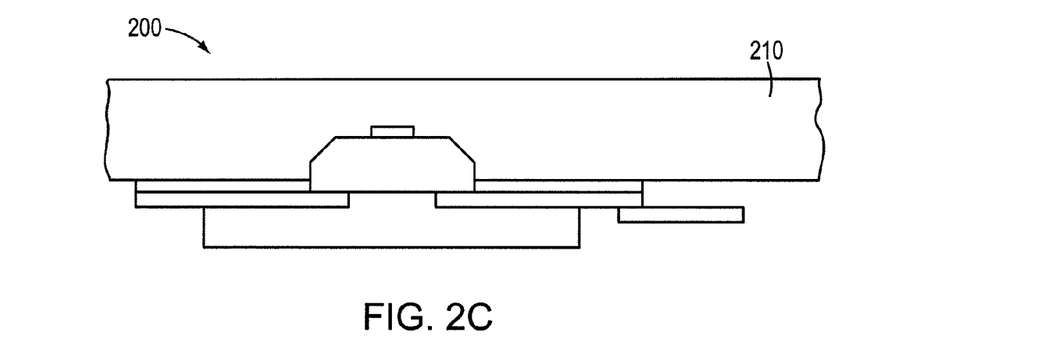

Referring to FIGS. 2A, 2B, and 2C, illumination device 200 includes or consists essentially of sub-assembly 100 disposed in direct contact with (i.e., mated to) a waveguide 210 having a recess 220 with a geometric profile complementary to the geometric profile of carrier 110. FIG. 2C is a sectional view (through line B-B' in FIG. 2A) of waveguide 210 with the raised portion of the carrier 110 of sub-assembly 100 received within the recess 220 and reflector 160 flush against the bottom surface of waveguide 210. The exploded view of FIG. 2B illustrates recess 220 and its geometric complemetarity to carrier 110. As shown in FIG. 2C, when sub-assembly 100 is mated to waveguide 210, the raised portion of carrier 110 fits snugly within (and may be in mechanical contact with) recess 220; any gap therebetween is preferably filled with, e.g., transparent optical encapsulation material, e.g., an epoxy, silicone, or polyurethane. An adhesive (which is preferably transparent) may be utilized to retain reflector 160 against the waveguide 210. Thus, discrete light source 150 is disposed within the thickness of waveguide 210, and substantially all (i.e., more than approximately 90% of) light from discrete light source 150 is emitted into (and may be coupled into) waveguide 210 during operation of illumination device 200. Reflector 160, in direct contact with the bottom surface of waveguide 210, reflects light that would otherwise be lost back into waveguide 210. In an alternative embodiment, reflector 160 is not present, and the portions of the bottom surface of waveguide 210 in contact with sub-assembly 100 are coated with a reflective material, e.g., aluminum or silver. In this way, once again, light from discrete light source 150 is retained within waveguide 210.

Waveguide 210 may include or consist of a rigid or flexible polymeric material, may have a substantially planar top surface (that includes at least one region from which light is emitted during operation). Assembly of illumination device 200 is facilitated by the complementary geometric profiles of carrier 110 and recess 220, since, e.g., it is unnecessary to mold waveguide 210 around carrier 110 and discrete light source 150. Although carrier 110 and recess 220 (and cap 310 described below) are depicted as having a particular geometric profile, any number of complementary geometric profiles are compatible with embodiments of the present invention.

Figure 3:
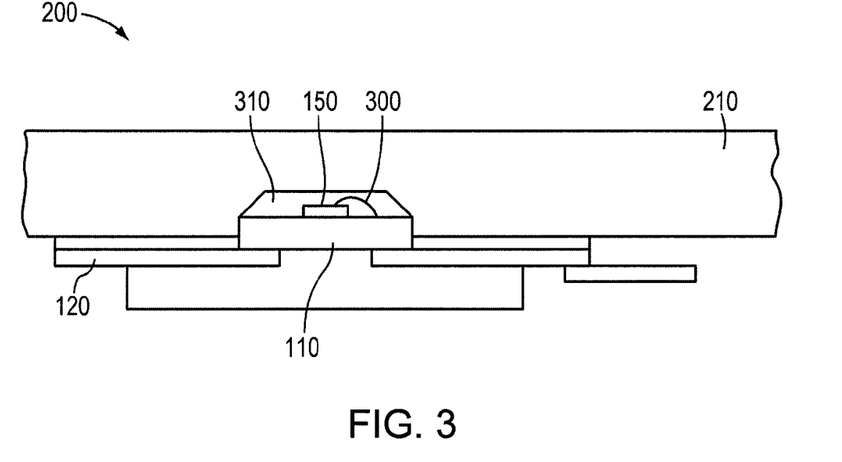
FIGS. 3, 4A, and 4B are sectional views of sub-assemblies according to various alternative embodiments of the present invention.

Referring to FIG. 3, in an embodiment, discrete light source 150 has at least one contact electrically connected to carrier 110 by a wire 300. For example, in an embodiment, discrete light source 150 is a "vertical" LED and has one bottom contact electrically connected to carrier 110 as described above with reference to FIG. 1C. Additionally, vertical discrete light source 150 has a top contact electrically connected to carrier 110 via wire 300 bonded between the top contact and a bonding pad on the top surface of carrier 110. Wire 300 includes or consists essentially of an electrically conductive material, e.g., a metal such as copper or gold. An encapsulating cap 310 may be disposed over carrier 110, discrete light source 150, and wire 300, and may include or consist essentially of an optically transparent material (e.g., epoxy, silicone, or polyurethane) such that light from discrete light source 150 efficiently couples into waveguide 210 during operation. Cap 310 and/or carrier 110 may have a geometric profile complementary to that of recess 220 in waveguide 210, such that there is substantially no gap therebetween when sub-assembly 100 is mated to waveguide 210. Further, wire 300 is the only opaque component present in illumination device 210 between discrete light source 150 and waveguide 210, thus enabling efficient in-coupling of light. In order to prevent absorptive light loss, wire 300 may be inherently reflective or coated with a reflective coating such that light striking wire 300 may reflect into waveguide 210. In some embodiments, discrete light source 150 has two top contacts electrically connected to carrier 110 via wires 300.

Figure 4A:
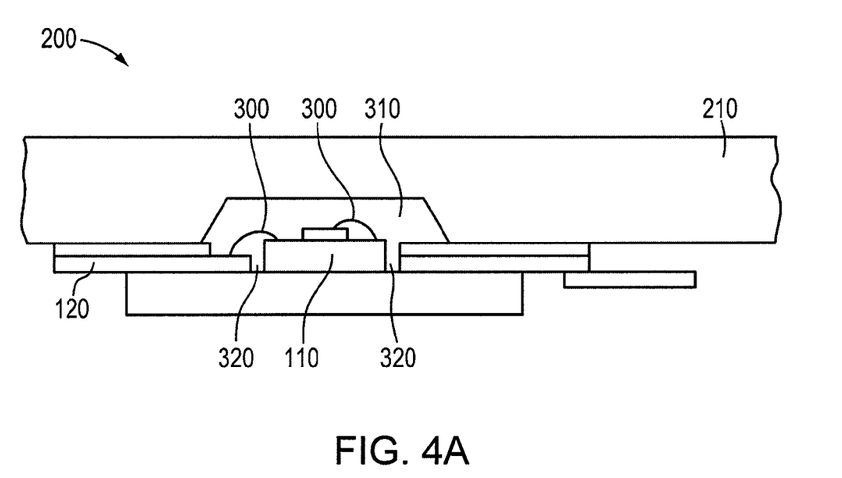

FIG. 4A illustrates an embodiment similar to that depicted in FIG. 3, but in which the electrical connection between carrier 110 and substrate 120 is via another wire 300. In order to substantially prevent light loss in such an embodiment, gap 320 between carrier 110 and substrate 120 may be filled or covered by a reflective material, e.g., a white solder mask such as PSR-400 LEW1 available from Taiyo America. Cap 310 is disposed over all wires 300 and preferably has a geometric profile complementary to that of recess 220 in waveguide 210.

Figure 4B:
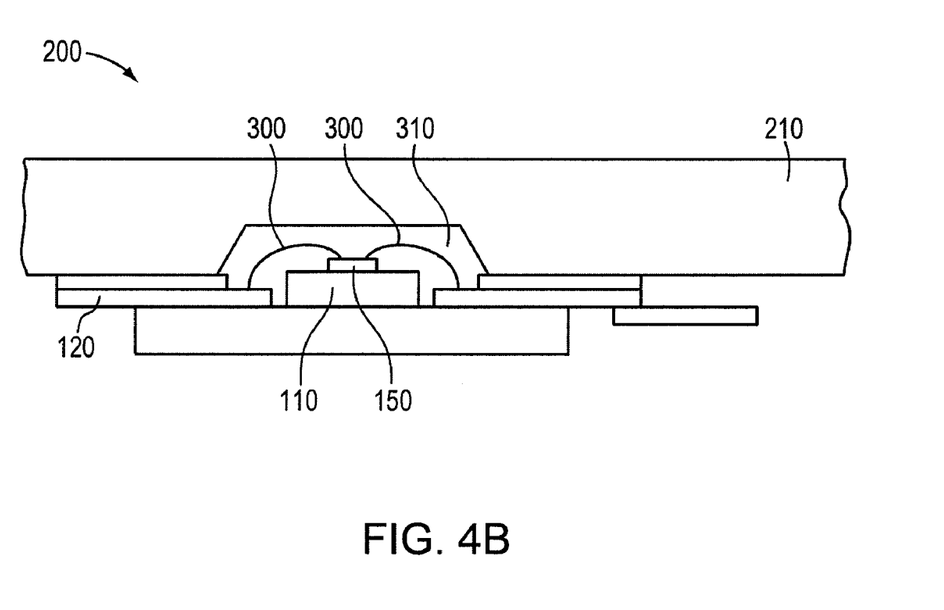

Referring to FIG. 4B, in another embodiment, wires 300 may connect at least one contact of discrete light source 150 directly to substrate 120 (thereby bypassing carrier 110). In this embodiment, a portion of reflector 160 may be removed in order to expose the electrical connection to substrate 120 (e.g., a bonding pad). Any exposed area around the bonding pad may be covered by a reflective material, e.g., a white solder mask such as PSR-400 LEW1.

Figure 5A:
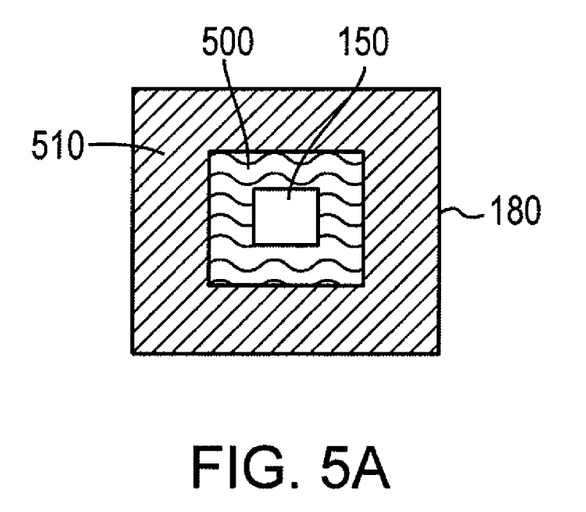
FIGS. 5A and 5B are top views of a top surface of a carrier utilized in a sub-assembly, according to various exemplary embodiments of the present invention.
Figure 5B:
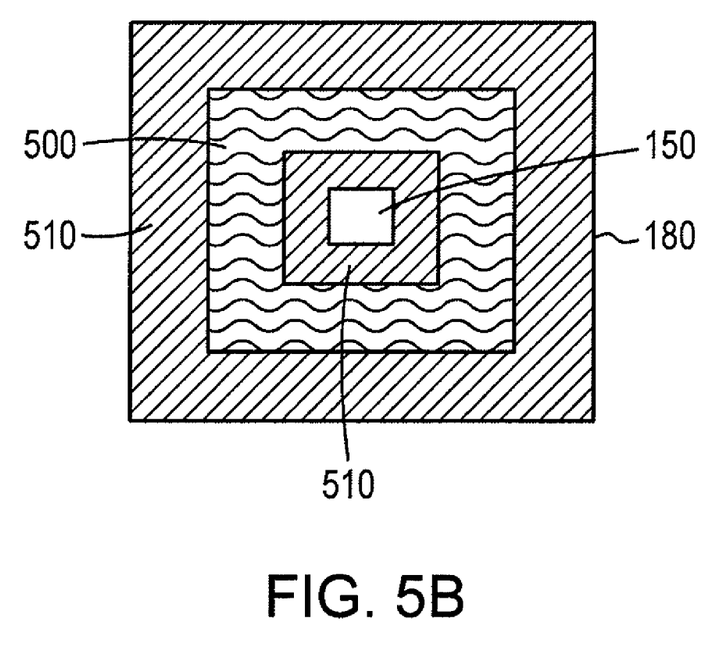

Referring to FIGS. 5A and 5B, top surface 180 of carrier 110 is preferably reflective, in order to prevent absorptive light loss into carrier 110. Moreover, at least one dimension of top surface 180 is as much as two, three, five, or even ten times as large as a dimension of discrete light source 150 in order to provide more efficient in-coupling of light into waveguide 210. The area of top surface 180 may be as much as three, five, ten, twenty-five, or even one hundred times as large as the top surface area of discrete light source 150. Moreover, top surface 180 may include discrete diffusive regions 500 and specular regions 510, arranged according to the type of discrete light source 150 disposed thereon. For example, FIG. 5A depicts an embodiment in which substantially all light from discrete light source 150 is emitted from a top surface thereof (i.e., the surface of discrete light source opposite carrier 110). Diffusive region 500 immediately surrounding discrete light source 150 diffusively reflects substantially all light emitted from discrete light source 150 that back-reflects toward discrete light source 150. Specular region 510 surrounding diffusive region 500 specularly reflects light into waveguide 210, essentially mimicking the total internal reflectance (and light-confining) behavior of waveguide 210.

FIG. 5B depicts an embodiment in which discrete light source 150 emits light from not only its top surface but its side surfaces. In such an embodiment, top surface 180 of carrier 110 includes a specular region 510 immediately surrounding discrete light source 150, such that laterally emitted light is reflected into waveguide 210. Surrounding this specular region 510 are the diffusive region 500 and additional specular region 510 described above in reference to FIG. 5A. The diffusive region 500 again diffuses back-reflected light and the outer specular region 510 reflects light into waveguide 210. The arrangements of diffusive regions 500 and specular regions 510 depicted in FIGS. 5A and 5B facilitate the in-coupling of substantially all of the light emitted by discrete light source 150 into waveguide 210.

Figure 6A:
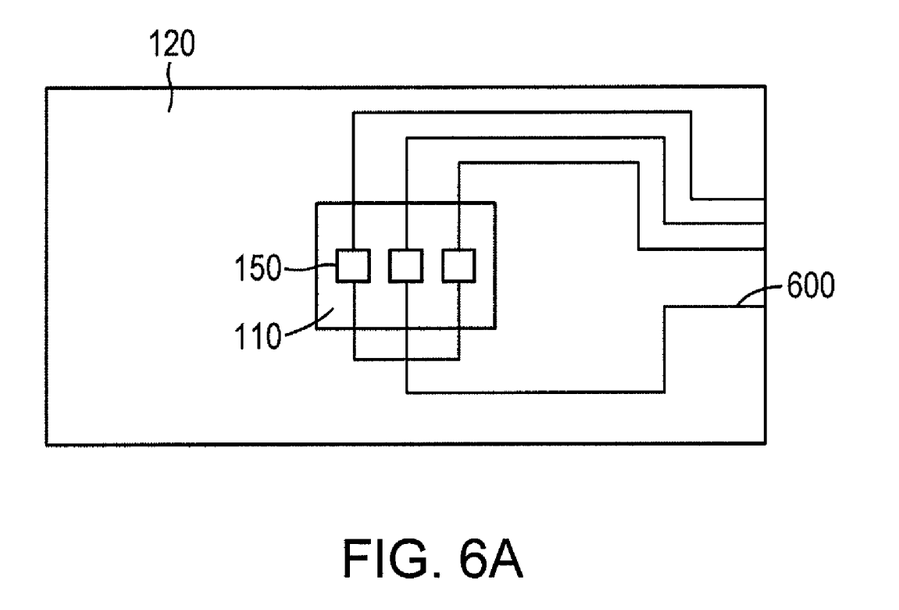
FIGS. 6A and 6B are schematic wiring diagrams for light sources utilized in various embodiments of the present invention.
Figure 6B:
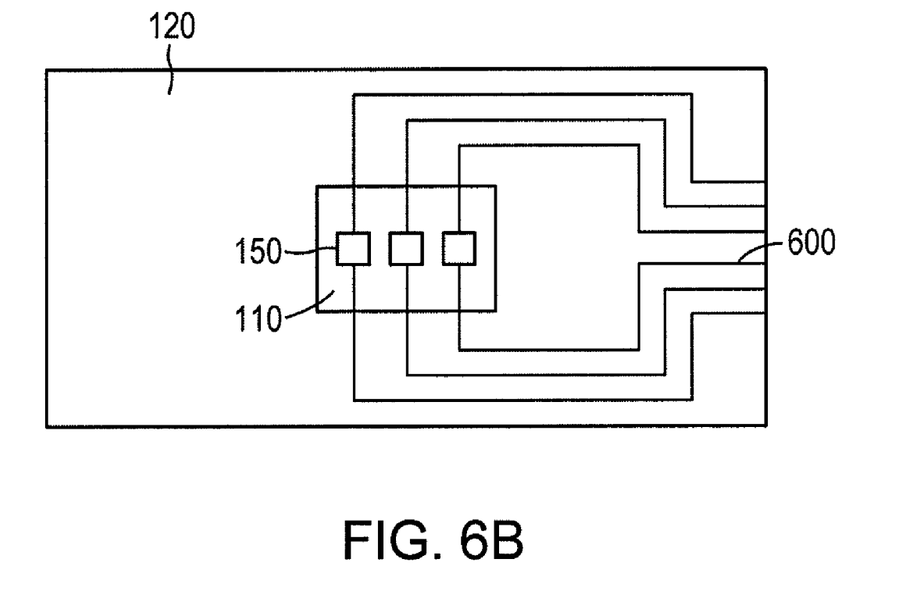

In embodiments of the invention having multiple discrete light sources 150 disposed on carrier 110, the discrete light sources 150 (and/or other discrete lighting devices such as packaged light-emitting diodes) may be connected either in series or in parallel, depending upon the demands of the application. FIGS. 6A and 6B schematically depict series and parallel connections, respectively, among three discrete light sources 150. In both embodiments depicted in FIGS. 6A and 6B, the electrical interconnections 600 (which may be disposed in or on carrier 110 and substrate 120) associated with carrier 110 are identical, and the series or parallel connectivity is defined by the electrical interconnections 600 present on substrate 120. That is, it is unnecessary to vary the production or configuration of carrier 110 based on whether discrete light sources 150 are to be ultimately connected in series or in parallel. FIGS. 6A and 6B are schematic drawings, and do not include features such as reflector 160, electrical connection means 140, diffusive regions 500, and specular regions 510, and do not indicate any geometric profile of carrier 110. Enabling different connectivities of a plurality of discrete light sources 150 via changes only in the electrical interconnections 600 on substrate 120 facilitates the production of a plurality of illumination devices 200 that include substantially identical carriers 110 (and, perhaps, discrete light sources 150) but which facilitate serial, parallel, or mixed serial and parallel connections among the illumination devices 200.

Figure 7A:
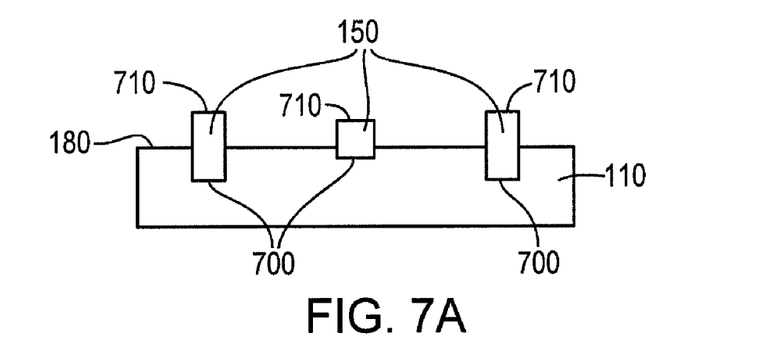
FIGS. 7A-7C are schematic illustrations of carriers with various surface topographies utilized in various embodiments of the present invention.

Carrier 110 may, if desired, have a top surface topography shaped to maximize the amount of light in-coupled into waveguide 210 and to minimize the amount of light absorbed or obstructed by the discrete light sources 150 themselves. FIG. 7A depicts a carrier 110 that includes a plurality of cavities 700 in the top surface thereof. The cavities 700 are sized and shaped such that the top surfaces 710 of discrete light sources 150, which have different thicknesses, are substantially coplanar when placed on carrier 110. In such an embodiment, the top surfaces 710 are disposed above all other components associated with sub-assembly 100 (except for any wires connected to discrete light sources 150, if present), enabling the efficient in-coupling of light into a waveguide 210 with substantially no light from one discrete light source 150 being absorbed or obstructed by any other discrete light sources 150 present on carrier 110.

Figure 7B:
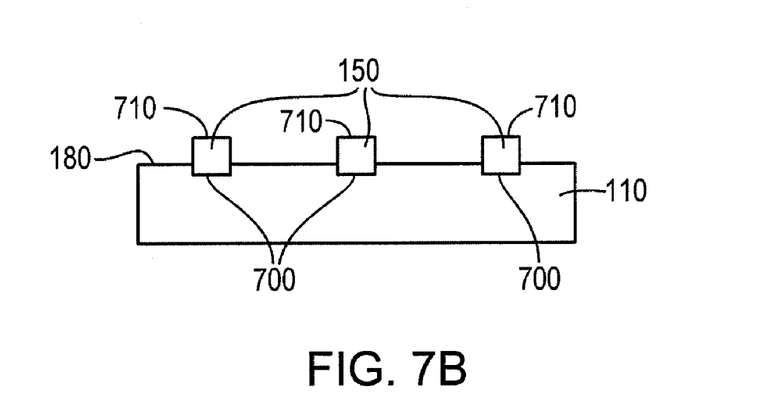

FIG. 7B depicts a plurality of top-emitting discrete light sources 150 disposed in cavities 700 in a carrier 110. Since the light from such discrete light sources 150 is emitted from only top surfaces 710, only a small amount of the thickness of the discrete light sources 150 protrudes above top surface 180 of carrier 110. In some embodiments, cavities 700 are sized and shaped such that top surfaces 710 of discrete light sources 150 are substantially coplanar with top surface 180 of carrier 110, i.e., substantially none of the thickness of discrete light sources 150 protrudes above top surface 180.

Figure 7C:
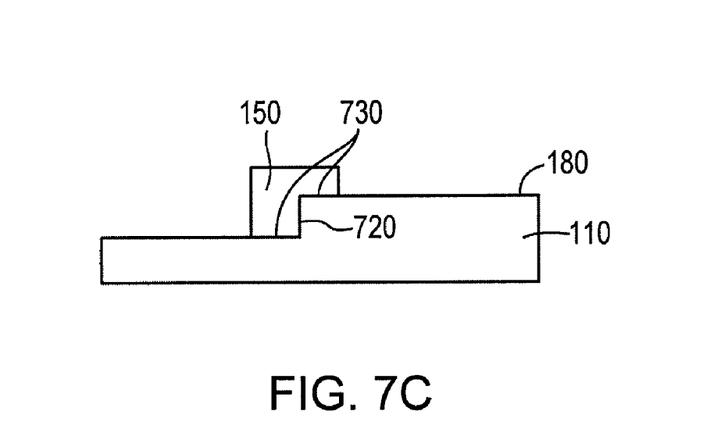

FIG. 7C depicts a carrier 110 having a top surface 180 with a "step" 720 (or other suitable topographical feature) sized and shaped to enable "flip chip"-type bonding of a discrete light source 150 having two top contacts. Such discrete light sources 150, also termed "horizontal" light sources, require contacts made to two vertically stacked layers therein. Thus, the two "top" contacts are actually made at slightly different heights, and the discrete light source 150 has a stepped shape to enable contact with the lower of the two layers. Embodiments of the invention may include such horizontal discrete light sources 150 flipped over and electrically coupling to contact pads 730 disposed to either side of step 720. Thus, one or more horizontal discrete light sources 150 may be electrically connected to carrier 110 without the use of wires that might obstruct or block emitted light.

Figure 8:
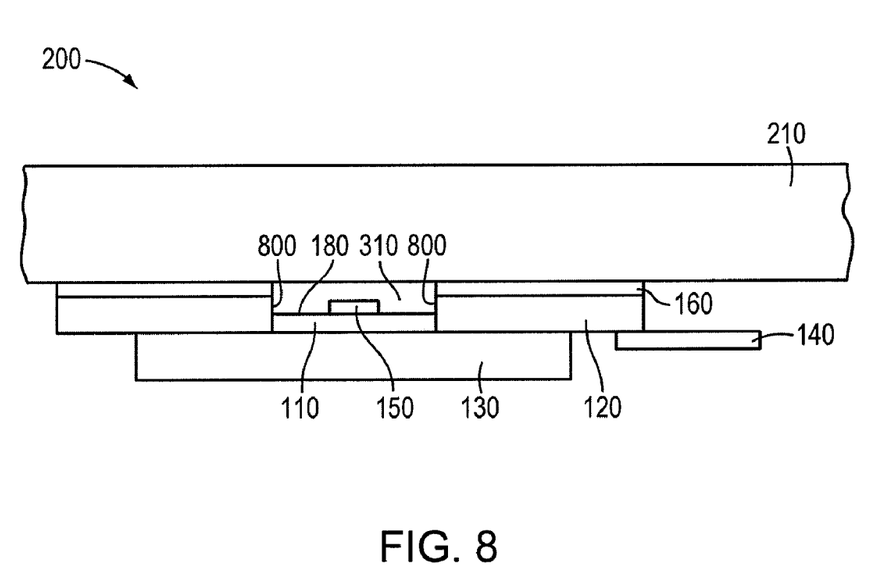
FIG. 8 is a sectional view of an illumination device having a substantially planar interface between a sub-assembly and a waveguide, according to various embodiments of the present invention.

Referring to FIG. 8, embodiments of the invention also include an illumination device 200 having a substantially planar interface between waveguide 210 and sub-assembly 100. In particular, waveguide 210 may substantially lack any recess 220. In this embodiment, top surface 180 of carrier 110 is disposed below the top surface of substrate 120 and/or reflector 160 such that discrete light source 150 is not disposed within waveguide 210. In some embodiments, an optically transparent cap 310 may be disposed over discrete light source 150 and top surface 180 of carrier 110. The top surface of cap 310 may be substantially coplanar with the top surface of substrate 120 and/or reflector 160 such that the interface between waveguide 210 and sub-assembly 100 is substantially completely planar. In such embodiments, sub-assembly 100 may be attached to waveguide 210 via an adhesive, e.g., transparent optical glue. Further, sidewalls 800 of substrate 120 and/or reflector 160 disposed proximate carrier 110 may also be reflective (or coated with a reflective material) so as to reflect rather than obstruct or absorb light from discrete light source 150.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A sub-assembly matable to a waveguide having a recess therein, the sub-assembly comprising:
   a substrate;
   a carrier having a substantially planar top surface raised above a top surface of the substrate, the carrier and the substrate being (i) different materials and (ii) discrete from each other;
   a bare-die light-emitting diode disposed on and in direct contact with the substantially planar top surface of the carrier such that, when the sub-assembly is joined to the waveguide, the discrete light source is within the waveguide
   an optically transparent encapsulation material entirely filling the recess to encapsulate the bare-die light-emitting diode and contacting at least one of the substrate or the carrier such that light from the bare-die light-emitting diode is efficiently coupled into the waveguide; and
   a gap laterally between the carrier and the substrate, wherein a reflective material is disposed in the gap for reflecting light from the bare-die light-emitting diode into the waveguide.

2. The sub-assembly of claim 1, wherein a lateral dimension of a top surface of the carrier is at least three times a lateral dimension of the bare-die light-emitting diode.

3. The sub-assembly of claim 2, wherein the top surface of the carrier has an area at least three times an area of a top surface of the bare-die light-emitting diode.

4. The sub-assembly of claim 1, wherein the substantially planar top surface of the carrier is reflective.

5. The sub-assembly of claim 4, wherein the reflective top surface of the carrier is disposed within the recess.

6. The sub-assembly of claim 1, further comprising a reflector disposed over the substrate.

7. The sub-assembly of claim 6, wherein the reflector is in direct contact with the substrate and the waveguide.

8. The sub-assembly of claim 6, wherein a portion of the reflector is disposed within the recess.

9. The sub-assembly of claim 8, wherein the reflector is in direct contact with the substrate and the optically transparent encapsulation material.

10. The sub-assembly of claim 1, wherein the bare-die light-emitting diode is electrically connected to the carrier.

11. The sub-assembly of claim 10, wherein the bare-die light-emitting diode is electrically connected to the carrier by at least one wire.

12. The sub-assembly of claim 11, wherein at least a portion of at least one said wire is raised above and not in contact with the top surface of the carrier.

13. The sub-assembly of claim 1, wherein the substrate comprises an electrical connector for connection to an external power source.

14. The sub-assembly of claim 1, wherein the bare-die light-emitting diode occupies only a portion of the top surface of the carrier.

15. The sub-assembly of claim 1, further comprising a heat spreader disposed beneath and in contact with at least one of the substrate or the carrier.

16. The sub-assembly of claim 1, wherein the substrate is a printed circuit board.

17. The sub-assembly of claim 1, wherein the carrier comprises a ceramic material.

18. The sub-assembly of claim 1, wherein the carrier is electrically connected to the substrate by at least one wire.

19. The sub-assembly of claim 18, wherein at least a portion of at least one said wire is raised above and not in contact with the top surface of the substrate.

20. The sub-assembly of claim 1, wherein the optically transparent encapsulation material contacts both the substrate and the carrier.

21. The sub-assembly of claim 1, wherein the top surface of the carrier and the top surface of the substrate are substantially parallel.

22. The sub-assembly of claim 1, wherein the carrier is disposed upon and in direct contact with a top surface of a heat spreader comprising a thermally conductive material.

23. The sub-assembly of claim 22, wherein the substrate is disposed upon and in direct contact with the top surface of the heat spreader.

24. A method of forming a sub-assembly matable to a waveguide having a recess therein, the method comprising:
   providing a carrier having a substantially planar top surface raised above a top surface of a substrate, the carrier and the substrate being (i) different materials and (ii) discrete from each other;
   providing a bare-die light-emitting diode over and in direct contact with the substantially planar top surface of the carrier such that, when the sub-assembly is mated to the waveguide, the discrete light source is within the waveguide
   providing an optically transparent encapsulation material entirely filling the recess to encapsulate the bare-die light-emitting diode and contacting at least one of the substrate or the carrier such that light from the bare-die light-emitting diode is efficiently coupled into the waveguide; and
   providing a gap laterally between the carrier and the substrate, wherein a reflective material is disposed in the gap for reflecting light from the bare-die light-emitting diode into the waveguide.

* * * * *